United States Patent [19]
VanRhyn

[11] Patent Number: 4,798,928
[45] Date of Patent: Jan. 17, 1989

[54] APPARATUS FOR TACK WELDING A TUBE TO A TUBESHEET

[75] Inventor: Lucas H. VanRhyn, Dansville, N.Y.

[73] Assignee: Foster Wheeler Energy Corporation, Clinton, N.J.

[21] Appl. No.: 30,306

[22] Filed: Mar. 26, 1987

[51] Int. Cl.⁴ .............................................. B23K 9/12
[52] U.S. Cl. ............................... 219/60.2; 219/125.11
[58] Field of Search ................... 219/60.2, 60 A, 60 R, 219/125.11, 124.1, 124.22, 98

[56] References Cited

U.S. PATENT DOCUMENTS

| | | | |
|---|---|---|---|
| 3,513,286 | 5/1970 | Puls | 219/125.11 |
| 3,643,059 | 2/1972 | Hill et al. | 219/125 R |
| 4,465,917 | 8/1984 | Heider | 219/98 |
| 4,594,495 | 6/1986 | Glorioso | 219/98 |

FOREIGN PATENT DOCUMENTS

| | | | |
|---|---|---|---|
| 3412494 | 8/1985 | Fed. Rep. of Germany | 219/60.2 |
| 1463434 | 11/1966 | France | 219/60.2 |
| 950258 | 2/1964 | United Kingdom | 219/60.2 |

Primary Examiner—Clifford C. Shaw
Attorney, Agent, or Firm—Marvin A. Naigur; Robert J. Seman; John E. Wilson

[57] ABSTRACT

Welding apparatus for positioning a tube with respect to a tubesheet and then tack welding the tube to the tubesheet. The welding apparatus has a pilot which can be positioned within the tube and then expanded so that when the pilot is moved the tube can be moved against a tube stop on the main body of the welding apparatus which can then be moved so that the tube is in a predetermined position with respect to the tubesheet and the welder can be energized to tack weld the tube preparatory to the final welding operation which permanently fixes it to the tubesheet.

12 Claims, 2 Drawing Sheets

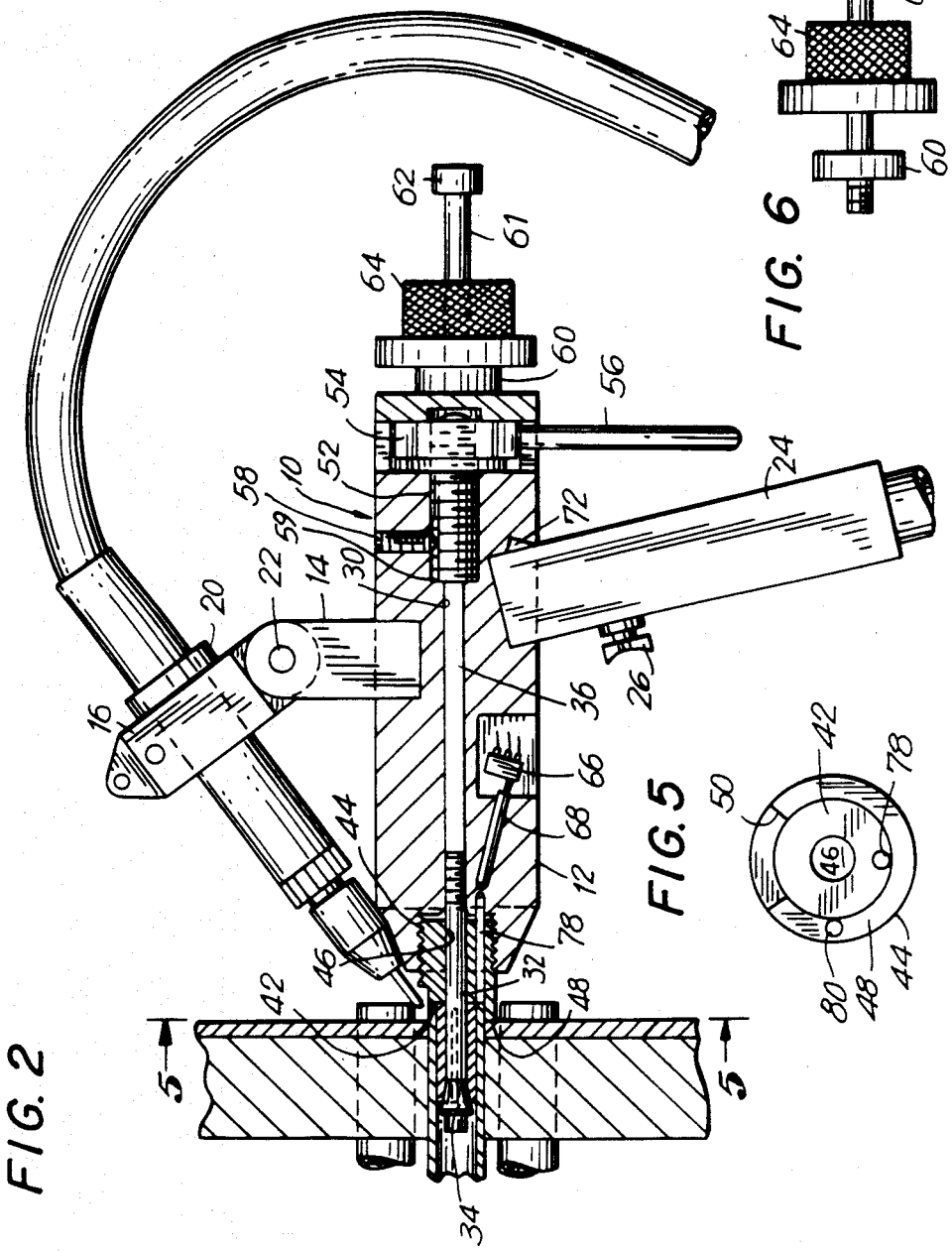

APPARATUS FOR TACK WELDING A TUBE TO A TUBESHEET

BACKGROUND OF THE INVENTION

Among the most common designs of heat exchangers in operation is the tube and tubesheet type in which tubes extend between a pair of tubesheets and contain a flowing fluid which exchanges heat with a second fluid flowing between the tubesheets and over the tubes. In such a design, it is important that the tubes, which, at their end portions extend through holes in the tubesheets are welded so that there is no leakage through the tubesheet holes. The tubes are conventionally welded at their ends to the tubesheets at the tubesheet surfaces which are closest to the ends of the tubes.

The tubes are conventionally positioned so that their ends project a predetermined distance beyond the tubesheets by a procedure commonly referred to as staking and setting.

The tubes are stacked by placing a prick punch against the face of the tubesheet with the working end adjacent to the tube to be set. The punch is struck with a hammer to move a small amount of metal against the tube. This operation is usually performed at several locations about the tube hole, perhaps at three points spaced 120 degress apart.

The above described staking and setting operations are not without their drawbacks. For one, they are time consuming. Quite often, the tube will slip back into the tubesheet hole requiring subsequent retrieval with a special tool followed by restaking and resetting.

The tube wall is sometimes deformed during the staking operation. This is usually due to the punch being held at the wrong angle, causing it to glance off the tubesheet and into the tube wall. As a result, dimples on the outer tube surfaces are formed which have to be removed prior to welding because they interfere with the operation of the welding equipment which is used to join the tubes to the tubesheets.

After the staking operation, the heat exchanger is often moved, as for example, by a crane, to a location where the tubes are permanently welded in place. During this transfer, the tubes often flex causing some of them to pull loose, thus requiring subsequent restaking and resetting.

Often, after several of the tubes are permanently welded, the operator must restake adjacent tubes because the heat generated by welding tends to loosen them.

Thus the staking and setting operations often have to be performed several times during the manufacture of a tube to tubesheet heat exchanger. Therefore, the operations necessary to properly position the tubes so that they can be permanently welded to the tubesheet are lengthly and therefore expensive.

SUMMARY OF THE INVENTION

It is an object of the present invention to overcome drawbacks in the prior art such as those discussed above. Accordingly, apparatus for tack welding a plurality of tubes to a tubesheet is provided with a main body having a channel extending within, a welding torch connected with the main frame for performing a weld at one end of the main frame, a tube pilot having a bore extending along its longitudinal axis, the bore being flared outward at one end thereof, a tube pilot expander having an outer surface which is flared outward at one end thereof, the tube pilot expander being positioned so that the flared surface thereof contacts the flared portion of the bore and so that it projects into the channel. The main frame can be positioned so that the pilot is within a tube projecting through a tubesheet and the end of the tube abuts a tube stop coaxial with the tube pilot and fixed with respect to the main frame. The pilot expander can then be moved toward the other end of the main frame so that the flared surface of the expander and the flared portion of the pilot co-act to expand the pilot outward and hold the tube in a fixed position with respect to the main frame which can then be moved toward the tube sheet to position the tube so that it projects a predetermined distance beyond the tubesheet and the welding torch is disposed whereupon energization, it tack welds to the tube to the tubesheet.

BRIEF DESCRIPTION

FIG. 2 is a side-view partly in section showing welding apparatus made in accordance with the present invention;

FIG. 5 is an enlarged end view of the tube projection insert taken on line 5—5 of FIG. 2 showing the relative locations of the microswitch actuator rods and the cut away portion of the tube stop; and FIG. 6 is a side-view of the slide hammer shown in FIG. 2 showing operation of the slide hammer.

DETAILED DESCRIPTION OF THE PREFERRED EMBODIMENT

Figure 1:
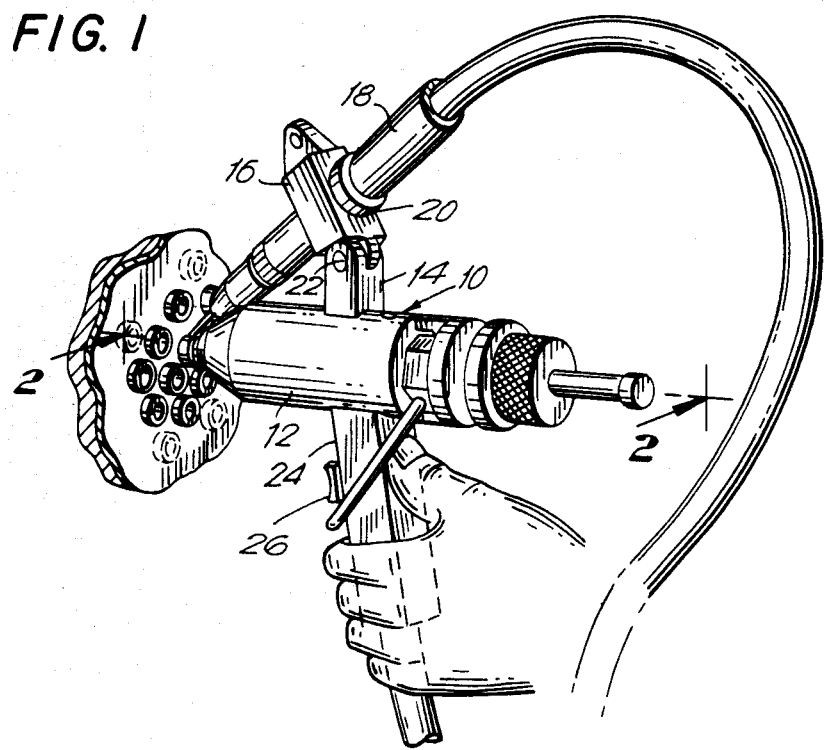
FIG. 1 is a perspective view showing the present invention in use.
Figure 3:
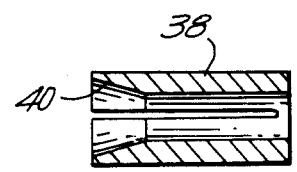
FIG. 3 is an enlarged side-sectional view of the pilot shown in FIG. 2.
Figure 4:
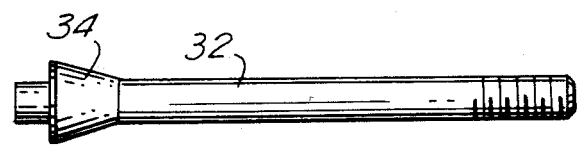
FIG. 4 is an enlarged side-view of the pilot expander shown in FIG. 2.

FIG. 1 shows the welding apparatus of the present invention indicated generally as 10. It includes a main frame 12 to which is affixed an upwardly extending torch support 14 which is connected to a torch holder 16. A welding torch 18, preferably of the tungsten inert gas type which can be moved longitudinally through a locating collar 20, which is rotatably mounted on the torch holder 16 can be positioned so that the torch is the correct distance from the workpiece to create an optimum tack weld. Locating collar 20 can be threaded upon the outer surface of the torch or it can grasp the torch sufficiently tight to hold it in the proper position when it is adjusted to the satisfaction of the operator. A pivotal connection 22 may likewise be of a press fit, or, more likely, one which incorporates a nut which must be loosened to change the angle of the torch holder 16 with respect to the workpiece. The locating collar 20 and pivotal connection 22 can thus be used to assure that the distance between the torch and the workpiece as well as the angle between the torch and the workpiece are exactly as desired by the operator for an optimum weld. The weld apparatus 10 includes a handle 24 which is fixed to and projects downwardly from the main frame 12. It supports a weld cycle start switch 26 which can be actuated by the operator to begin welding. Extending longitudinally through the main frame 12 is a channel 30 (FIG. 2) which is generally circular in cross section and in which is positioned a pilot expander 32. As shown in FIG. 2 and FIG. 4, the pilot expander 32 includes a flared portion 34 at one end, and at its other end the pilot expander is threaded into a pilot expander pull rod 36. The pilot expander 32 is positioned within a pilot 38 shown by itself in FIG. 3, with the flared portion 34 against a flared portion 40 of the pilot so that if the pilot is within a snuggly fitting tube and the pilot expander is pulled back, the tube will be held immovable with respect to the pilot 38.

Before expanding the pilot, the welding apparatus is positioned so that the tube abuts against a tube stop 42 which, as shown in FIG. 2, is an annular surface at one end of a tube projection insert 44. The tube projection insert includes a channel 46 (FIG. 5) which, when the insert is screwed into the end of the main frame 12, as shown in FIG. 2, is aligned longitudinally with the channel 30 in the main frame 12. Tube stop 42 is encircled by a tube projection gauge in the form of a longitudinally extending lip 48 which at the top of the tube projection insert 44 is cut away at 50 so that the welding torch will have access to the interface between the tube and the tubesheet when a tube abuts against the tube stop 42. The lip 48 is proportioned so that when the end of a tube is engaged by the tube stop 42 and the pilot expander has been pulled back to expand the pilot 38 and thereby fixedly engage the tube, the welding apparatus 10 can be moved to the tubesheet so that the lip 48 will abut against the tubesheet and position the tube so that it projects beyond the tubesheet a distance exactly equal to the length of the lip 48. The torch 18 will then be used to rack weld the tube to the tubesheet and to fix the tube in a position where it projects a predetermined distance beyond the tubesheet so that it is properly prepared for the final welding operation.

The present invention is designed to aid the operator in strongly grasping the tube by exerting a large force against the inside of the tube with the pilot. To this end, a threaded cylinder 52 is provided (FIG. 2) on the pilot expander pull rod 36 and an internally threaded collar 54 engages the external threads of the cylinder 52. A pilot locking handle 56 projects outward from the collar 54 to allow the exertion of a fairly large torque on the internally threaded collar 54 to thereby exert a considerable longitudinal force on the pilot expander pull rod 36 as well as the pilot expander 32. A setscrew 58 is screwed through the main frame 12 into a slot 59 in the threaded cylinder 52 to prevent the pilot expander pull rod 36 from rotating when the pilot locking handle 56 is turned.

Occasionally, it is necessary to move a tube which has been grasped by the pilot but which fits rather snuggly within a tubesheet hole. To this end, an anvil member 60 is fixed at the outer end of the main frame with a slide hammer guide rod 61 extending through it. The slide hammer guide rod 61 is provided with a nob 62, that is, a portion of enlarged circumference at its outer end. Between the anvil 60 and nob 62 is a slide hammer 64 which can be slapped against either the anvil 60 or nob 62 to jerk the tightly fitting tube longitudinally through the tube hole as desired and as necessary to properly position it.

In order to prevent imprecise positioning of the tube, and welds which would thus fix the tube in an incorrect position, two microswitches are provided. A first microswitch 66 is actuated by means of a rod 68 which is positioned within the main frame 12 to engage the microswitch 66 at one end and at the other end, a rod 78 which is positioned so that it will engage against a tube when the tube is properly seated, that is, when the tube end abuts the tube stop 42. When the tube is thus seated and microswitch 66 is triggered, a red indicator 72 is extinguished.

When the operator pushes the present apparatus forward with a tube properly seated, the tube projection insert 44, contacts the tube sheet. When this occurs, a similar microswitch located 90 deg. about the longitudinal axis of the pilot expander 32 from the first microswitch 66 is actuated and a green indicator light on the side of the handle opposite to the indicator light 72 is energized. The later described microswitch is actuated by means of a rod 80 projecting out through the lip 48 (FIG. 5). The rod 80 can coact with a rod similar to rod 68 to actuate the microswitch it controls but since that microswitch and its associated actuating linkage are similar to microswitch 66 and its associated linkage, they are not illustrated in the drawings.

In operation, the operator positions the present apparatus so that the pilot 38 is positioned within a tube. The apparatus is advanced until the end of the tube abuts against the tube stop 42 as indicated by the indicator light 72 being extinguished.

Next, the operator turns the pilot locking handle 56 so that the pilot expander pull rod 36 is moved toward the handle 24. This step expands the pilot 38 to lock the tube in a proper position inside the tube projection insert 44.

The operator now pushes the apparatus and tube forward until the tube projection insert 44 contacts the tubesheet. The green indicator light illuminates and signals the operator that the weld cycle can be initiated.

If one of the two microswitches is not actuated, the tack weld cycle cannot be started. Thus it is not possible to create an excessively short or long tube projection. The slide hammer 64 enables the operator to tap the tube in place in the event that it is tightly engaged at the tubesheet hole. In the event that the tube end has moved beyond the tubesheet or in the event that the projection is too short, the operator can lock onto the tube and move it back towards himself by tapping the slide hammer 64 against nob 62.

Once a tube is properly tack welded, the operator moves on to another tube, and when all the tubes of the heat exchanger have been tack welded, the finished product weld can be made.

The foregoing describes but one preferred embodiment, other embodiments and modifications being contemplated within the scope of the following claims:

I claim:

1. An apparatus for tack welding a tube to a tubesheet comprising:

a main frame;

a welding torch attached to the main frame;

a tube stop fixed with respect to the main frame and having a surface for abutting an end of a tube projecting through and beyond a tubesheet;

a tube projection gauge fixed with respect to the main frame and projecting a predetermined distance in a direction beyond the tube stop, the tube projection gauge having a surface for abutting the tubesheet;

a tube pilot attached to the main frame and projecting in said direction beyond the tube projection gauge, the tube pilot being adapted for insertion into and fixation within the tube; and means to fix the tube pilot within the tube;

whereby the apparatus can be positioned so that the tube pilot is within the tube with the end of the tube abutting the tube stop, the tube pilot can be fixed within the tube to hold the tube in such position with respect to the apparatus, and the apparatus moved in said direction until the tube projection gauge contacts the tubesheet to properly position the tube with respect to the tubesheet for a tack weld upon actuation of the torch.

2. The apparatus defined in claim 1 wherein the welding torch is of the tungsten inert gas type.

3. The apparatus defined in claim 2 wherein the tube pilot has a bore extending through its center with a portion flared outwardly, and wherein the means to fix the tube pilot within the tube comprises a pilot expander extending through the bore in the tube pilot and having an outwardly flared portion so that when the pilot expander is moved in a direction opposite to that defined in claim 1 the flared portions will coact to expand the tube pilot and fix it within the tube.

4. The apparatus defined in claim 3 wherein the pilot expander is, at one location, externally threaded and, further comprising, an internally threaded collar engaging the pilot expander at its threaded portion and being positioned within a chamber within the main frame to prevent movement in the direction defined in claim 1 whereby turning the collar will move the pilot expander in a direction opposite to said direction to expand the tube pilot.

5. The apparatus defined in claim 3 further comprising a slide hammer, slidably mounted to be movable in said direction defined in claim 1 and in the opposite direction to slam into elements fixed with respect to the frame and permit movement of a tube held by the pilot even when the tube is tightly grasped by its associated tube hole.

6. The apparatus defined in claim 1 wherein the tube projection gauge is a lip concentrically extending around the tube stop.

7. The apparatus defined in claim 6 wherein the tube stop and the lip are integral parts of a tube projection insert which is positioned at one end of the apparatus.

8. The apparatus defined in claim 7 further comprising a torch support fixed to the main frame and connected with the torch so that the torch is positioned to weld at an interface between the tube and the tubesheet when an end of the tube abuts the tube stop and the lip abuts the tubesheet.

9. The apparatus defined in claim 8 wherein the torch is mounted on a torch holder and is selectively moveable with respect to said holder and away from the tubesheet.

10. The apparatus defined in claim 9 wherein the holder is pivotally mounted on the support to permit the angle between the torch and main frame to be adjusted.

11. The apparatus defined in claim 1 further comprising a microswitch, an electric lamp connected with the microswitch, and a rod projecting in said direction through and beyond the tube stop with one end of the rod connected with the microswitch, and an opposite end of the rod projecting beyond the tube stop, so that when a tube end abuts the tube stop, the tube end will engage the rod which in turn will actuate the microswitch to energize the electric lamp.

12. The microswitch defined in claim 11 further comprising a second microswitch, a second electric lamp connected with the second microswitch, and a second rod projecting in said direction through and beyond the tube projection gauge with one end of the second rod connected with the second microswitch, and an opposite end of the second rod projecting beyond the tube projection gauge, so that when the tube projection gauge contacts the tubesheet, the tubesheet will engage the second rod which in turn will actuate the second microswitch to energize the second electric lamp.

* * * * *